US010650645B2

(12) United States Patent
Levesque et al.

(10) Patent No.: US 10,650,645 B2
(45) Date of Patent: *May 12, 2020

(54) METHOD AND APPARATUS OF CONVERTING CONTROL TRACKS FOR PROVIDING HAPTIC FEEDBACK

(71) Applicant: IMMERSION CORPORATION, San Jose, CA (US)

(72) Inventors: Vincent Levesque, Montreal (CA); Jamal Saboune, Montreal (CA); David M. Birnbaum, Oakland, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/159,522

(22) Filed: Oct. 12, 2018

(65) Prior Publication Data

US 2019/0080570 A1 Mar. 14, 2019

Related U.S. Application Data

(63) Continuation of application No. 15/623,824, filed on Jun. 15, 2017, now Pat. No. 10,102,725, which is a
(Continued)

(51) Int. Cl.
*G08B 6/00* (2006.01)
*G06F 3/16* (2006.01)
*G06F 3/01* (2006.01)

(52) U.S. Cl.
CPC ............. *G08B 6/00* (2013.01); *G06F 3/016* (2013.01); *G06F 3/165* (2013.01)

(58) Field of Classification Search
CPC . G08B 6/00; G08B 1/08; G08B 1/045; G08B 1/0603; G06F 3/016; G06F 3/165; G09B 21/007; H04M 19/04; H04M 19/047
(Continued)

(56) References Cited

U.S. PATENT DOCUMENTS 6,285,351 B1 9/2001 Chang et al.
6,703,550 B2 3/2004 Chu
(Continued)

FOREIGN PATENT DOCUMENTS

CN 102841680 A 12/2012
CN 102227694 10/2016
(Continued)

OTHER PUBLICATIONS

Anonymous: "Transcoding—Wikipedia, the free encyclopedia," Feb. 27, 2013, Retrieved from the Internet: URL: http://en/wikipedia.org/w/index.php?title=Transcoding&oldid=540873849 [retrieved on Aug. 15, 2014].
(Continued)

*Primary Examiner* — Hung T Nguyen
(74) *Attorney, Agent, or Firm* — Medler Ferro Woodhouse & Mills PLLC

(57) ABSTRACT

Disclosed are systems and methods for converting a control track designed for use with a number and/or type of haptic output devices to be used with other numbers and/or types of haptic output devices. For example, a computing device may convert the control track into another control track that can be applied to other types and/or numbers of haptic output devices. The converted control track may be compatible for use with a smartphone or other system that includes a different number and/or type of haptic feedback devices than the system for which the haptic track was originally designed. In this manner, the user of the smartphone or other system may experience haptic feedback using a device that is different from another haptic feedback system for which the control track was originally designed for use. The conversion may occur locally at the smartphone or other system and/or remotely at another device.

20 Claims, 5 Drawing Sheets

Related U.S. Application Data continuation of application No. 15/191,907, filed on Jun. 24, 2016, now Pat. No. 9,715,798, which is a continuation of application No. 14/473,364, filed on Aug. 29, 2014, now Pat. No. 9,401,079.

(60) Provisional application No. 61/874,920, filed on Sep. 6, 2013.

(58) Field of Classification Search
USPC ....... 340/407.1, 7.6; 345/156, 173; 381/118; 463/30, 36; 715/702, 772
See application file for complete search history.

(56) References Cited

U.S. PATENT DOCUMENTS

| | | |
|---|---|---|
| 7,218,310 B2 | 5/2007 | Tierling et al. |
| 7,623,114 B2 | 11/2009 | Rank |
| 8,125,442 B2 | 2/2012 | Chu |
| 8,378,794 B2 | 2/2013 | Alarcon |
| 2003/0067440 A1 | 4/2003 | Rank |
| 2005/0275508 A1 | 12/2005 | Orr et al. |
| 2008/0294984 A1 | 11/2008 | Ramsay et al. |
| 2010/0328229 A1 | 12/2010 | Weber et al. |
| 2012/0206247 A1 | 8/2012 | Bhatia et al. |
| 2012/0306631 A1 | 12/2012 | Hughes |
| 2013/0038792 A1 | 2/2013 | Quigley et al. |
| 2013/0207917 A1 | 8/2013 | Cruz-Hernandez et al. |
| 2013/0227410 A1 | 8/2013 | Sridhara et al. |
| 2014/0270681 A1* | 9/2014 | Sen ........................ G11B 31/00 386/201 |
| 2014/0340298 A1 | 11/2014 | Aldossary |

FOREIGN PATENT DOCUMENTS

| | | | |
|---|---|---|---|
| JP | 2003228453 A | 8/2003 |
| JP | 2003-324402 A | 11/2003 |
| JP | 2005506613 A | 3/2005 |
| JP | 2013161473 A | 8/2013 |

OTHER PUBLICATIONS

E. Moore, "Convert Audio between 6/5.1 Channel, 2 Channel/Stereo and Mono," Jan. 17, 2013, pp. 1-2, Retrieved from the Internet: URL: http://www.bigasoft.com/articles/how-to-change-video-audio-channel-2-5.1-stereo-6-mono.html [retrieved on Sep. 23, 2014].

Examination Report for European Application No. 14183629.6, dated Mar. 26, 2018, 7 pages.

Examination Report for Chinese Application No. 102227694, dated Apr. 28, 2018, 7 pages.

Notification of the Second Office Action issued in Chinese Office Action No. 201410450016.2, dated Dec. 21, 2018.

Non-final Office Action issued in JP Application No. 2014-176078, dated Aug. 14, 2018.

Non-Final Office Action issued in Japanese Application No. 2014-176078, dated Jun. 18, 2019.

* cited by examiner

METHOD AND APPARATUS OF CONVERTING CONTROL TRACKS FOR PROVIDING HAPTIC FEEDBACK

CROSS-REFERENCE TO RELATED APPLICATIONS

This application is a continuation of prior U.S. patent application Ser. No. 15/623,824, filed on Jun. 15, 2017, now U.S. Pat. No. 10,102,725, which is a continuation of U.S. patent application Ser. No. 15/191,907, filed on Jun. 24, 2016, now U.S. Pat. No. 9,715,798, issued Jul. 25, 2017, which is a continuation of U.S. patent application Ser. No. 14/473,364, filed on Aug. 29, 2014, and issued as U.S. Pat. No. 9,401,079, which claims the benefit of priority from U.S. Provisional Patent Application Ser. No. 61/874,920, filed Sep. 6, 2013, the entire content of all of which is incorporated herein by reference.

FIELD

The disclosure relates to systems and methods of converting a control track for providing haptic feedback via a haptic output device.

BACKGROUND

Augmenting media with haptic feedback can create an immersive user experience. For example, explosions in a movie or video game or deep base in a song may be accompanied by haptic feedback that enhances the media experience. The haptic feedback can be specified by control tracks that are manually authored (e.g., designed by a person) or automatically generated (e.g., by a processing device). However, each of these techniques has benefits and drawbacks.

Manually authored control tracks may facilitate customized haptic feedback that is authored by a person and therefore may represent a more meaningful, visceral, representation of media content. However, manually authoring control tracks is a time consuming process. Manually-authored control tracks are typically generated for particular media content such as a specific movie and therefore are not suitable for use with other media content such as a different movie. As such, a control track that is manually authored for a given media content may not be applied to other media content. Furthermore, such manually-authored control tracks are typically designed for use with specialized haptic output systems such as a chair having multiple and different types of haptic output devices that can swivel the chair, move the chair up and down, etc. As such, the control tracks may therefore be incompatible with other types and/or number of haptic output devices such as those found on, among others, mobile communication devices.

Conventional automated systems may provide haptic feedback that is determined based on a computational analysis of the media content. Such systems may provide a cost effective and fast solution to provide haptic feedback to augment media content. However, these conventional systems may not provide compelling haptic feedback for all types of media content and may not provide a quality of haptic feedback compared to manually-authored control tracks that specify the haptic feedback. Furthermore, automatically generated control tracks may be incompatible with certain types of haptic output devices. These and other problems exist.

SUMMARY

The disclosure relates to systems and methods of converting a control track for providing haptic feedback via a haptic output device. The control track may be configured to provide haptic feedback via a particular number and/or type of haptic output devices. The system leverages such high quality control tracks that are designed for particular types and/or numbers of haptic output devices so that they can be applied to other types and/or numbers of haptic output devices.

For example, the control track may be manually authored or otherwise created for particular media content such as a movie. The control track may be tailored for use with a haptic output system such as a specialized chair equipped with a plurality of different types of haptic output devices to provide the haptic feedback while the user watches the movie.

The control track may be designed such that the different types and/or numbers of haptic output devices provide different types and/or numbers of haptic feedback such as a swivel type of haptic feedback that swivels the chair, a type of haptic feedback that moves the chair up and down, and/or other types of haptic feedback. The number and/or types of haptic feedback that are to be provided may be designed by an author to correspond to particular movie scenes or other media content.

In one implementation, a system may convert the control track for use with other numbers and/or types of haptic output devices. For example, the system may convert the control track that is specifically created for the chair into another control track (e.g., a control or drive signal) that can be applied to other types and/or numbers of haptic feedback devices. The converted control track may be compatible for use with a smartphone or other device that includes a different number or type of haptic feedback devices than the chair. In this manner, the user of the smartphone or other device may experience haptic feedback using a device that is different from the chair or other haptic feedback system for which the control track was originally designed for use. In one implementation, the control track may otherwise be incompatible for use with the smartphone or other device without such conversion by the system.

DETAILED DESCRIPTION

Figure 1:
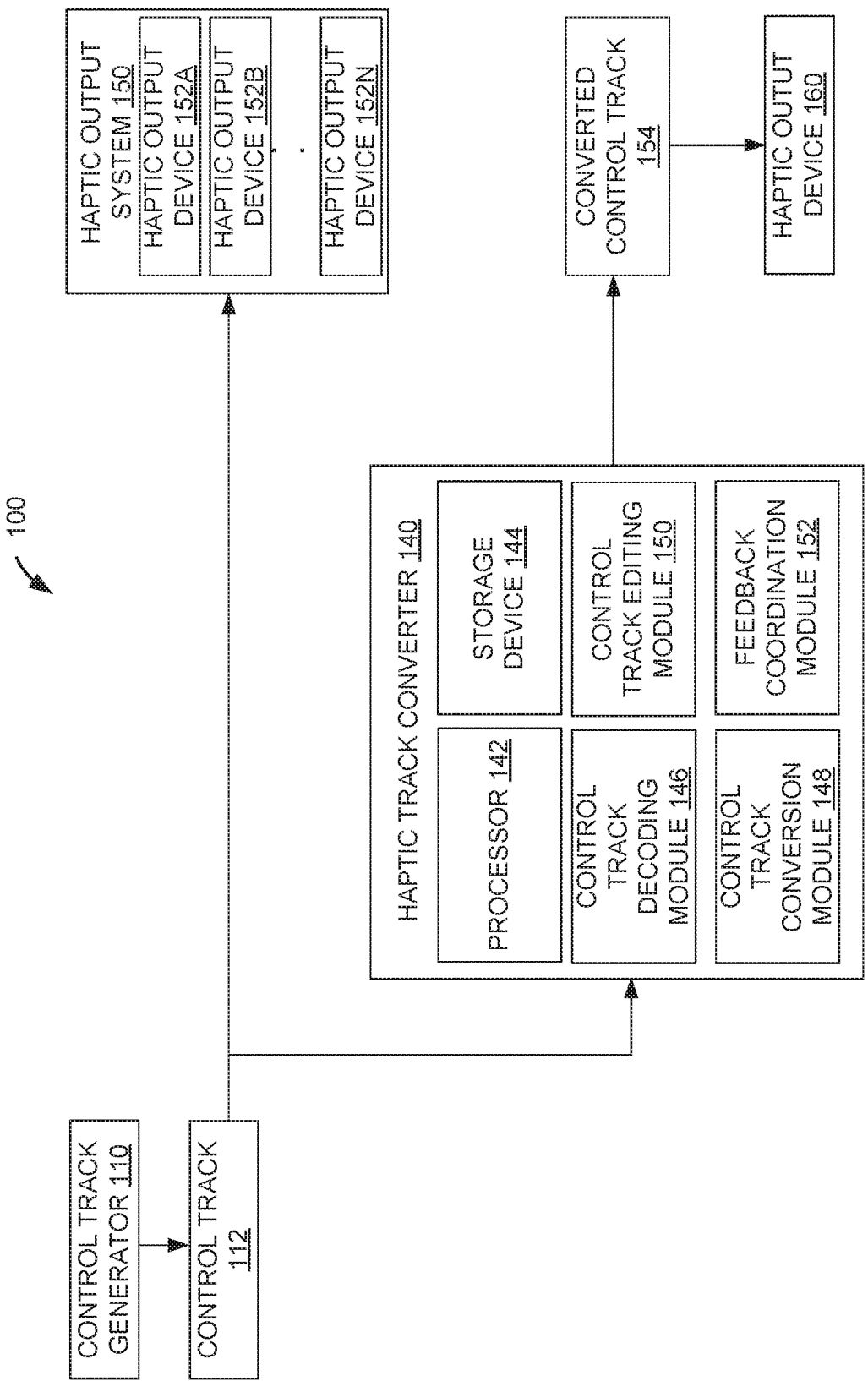
FIG. 1 illustrates a system of converting a control track for providing haptic feedback via a haptic output device, according to an aspect of the invention.

FIG. 1 illustrates a system 100 of converting a control track 112 for providing haptic feedback via a haptic output device 160, according to an aspect of the invention. System 100 may include a control track generator 110, a computing device 140, a haptic output system 170, haptic output device 160, and/or other components.

Control track generator 110 may include a device operated by a control track designer who creates a control track 112. Control track 112 may include control signals or other information that causes haptic output system 170 to provide one or more types of haptic feedback that is specifically created by the designer. Typically, although not necessarily, the control track is designed such that the haptic feedbacks are synchronized with media content such as a movie, video game, music, and/or other media content that can be played back. In this manner, the user who plays back the media content may be provided with the haptic feedbacks that correspond to various portions of the media content and are designed by the control track designer.

In some instances, control track 112 may be created automatically by a computing device without human intervention and/or created semi-automatically by the computing device with input by a human operator such as the control track designer. Whichever method is used to create control track 112, the haptic feedbacks specified by the control track may be tailored or otherwise intended for use with haptic output system 170.

Haptic output system 170 may include one or more haptic output devices 172 (illustrated in FIG. 1 as haptic output devices 172A, 172B, . . . , 172N). Control track 112 is usually designed for use with a particular haptic output system 170 and therefore may be incompatible with other haptic output devices.

As used herein, a control track is "incompatible" with a haptic output device when the particular haptic feedback specified by the control track cannot be produced by the haptic output device. For example, because the control track designer designed control track 112 for use with haptic output system 170, haptic output device 160 will not produce the particular haptic feedback designed by the control track designer or automated computer process when control track 112 is applied to haptic output device 160. Such incompatibility may arise from differences in signal formatting, differences in types/numbers of haptic output devices used to provide the haptic feedback (e.g., differences between types/numbers of haptic output devices 172 and haptic output device 160), and/or other characteristics of the control track or haptic output devices that cause the incompatible haptic output device to be unable to provide the particular haptic feedback. Furthermore, a haptic feedback may be "different" than another haptic feedback when a characteristic such as a magnitude, amplitude, duration, and/or other characteristic of the haptic feedback is different than the corresponding characteristic for the other haptic feedback.

Haptic output device 160 may include an actuator, for example, an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric material, electroactive polymers, or shape memory alloys, a macro-composite fiber actuator, an electro-static actuator, an electro-tactile actuator, and/or another type of actuator that provides physical feedback such as haptic (e.g., vibrotactile) feedback. The haptic output device 160 may include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on.

Computing device 140 may be programmed to convert control track 112 so that haptic output device 160 may provide haptic feedback based on a converted control track 154. The haptic feedback provided by haptic output device 160 may be used instead of, be representative of, or otherwise simulate the haptic feedback provided by haptic output system 170. In this manner, a control track that was designed for use with a particular haptic output system having a certain type and/or number of haptic output devices may be converted into a control track that can be used for a different type and/or number of haptic output devices.

Computing device 140 may include a processor 142 that is programmed with various modules, which may include, for example, computer programming instructions. The various modules, which may be stored in storage device 144, may include a control track decoding module 146, a control track conversion module 148, a control track editing module 150, a feedback coordination module 152, and/or other modules.

Computing device 140 may receive a control track 112, which may be streamed to computing device 140, stored at storage device 144, and/or otherwise transferred to computing device 140. Whether control track 112 is streamed, stored, and/or otherwise transferred, computing device 140 may be programmed to process the control track and generate the converted control track 154 based on the processed control track. Control track 154 may be provided to haptic output device 160, which may generate haptic feedback based on control track 154. Although illustrated separately, haptic output device 160 may be integrated with or separate from computing device 140. When separate, computing device 140 and haptic output device 160 may be coupled to one another via a wired or wireless connection. When integrated, processor 142 and haptic output device 160 may be coupled to one another using conventional circuitry.

In some implementations, control track decoding module 146 may be configured to decode control track 112. Control track decoding module 146 may decode control track 112 based on a pre-stored file (e.g., when control track 112 is stored on storage device 144) or based on a streamed control track 112 such that processing is performed as the control track is streamed.

Control track decoding module 146 may identify one or more individual channels from control track 112. An individual channel may be configured to cause a corresponding haptic output device 172 to generate a haptic feedback. In other words, each individual channel when applied to a corresponding haptic output device 172 causes haptic feedback to be generated by the corresponding haptic output device. Control track decoding module 146 may identify and determine such individual channels using conventional signal processing techniques.

In some implementations, control track decoding module 146 may be configured to extract from control track 112 meta-data that includes information that is related to media content. The meta-data may have been encoded in control track 112 by a haptic designer to describe corresponding media content. The meta-data may include, for example, a description of an event in the corresponding media content (e.g., an explosion in a movie or game), a command to execute a particular haptic feedback at a particular time during media playback (e.g., swivel chair for 10 seconds), and/or other information that is related to the corresponding media content. Computing device 140 may be configured to generate control track 154 based on the meta-data, as described below.

In some implementations, control track conversion module 148 may be configured to generate control track 154 based on control track 112. Control track conversion module 148 may generate control track 154 by creating an all-new control track or by modifying control track 112. In this manner, control track conversion module 148 may "convert" control track 112 into control track 154 whether or not control track 154 is newly generated or merely a modified form of control track 112.

Control track conversion module 148 may analyze the one or more individual channels decoded from control track 112 to generate the same or different number (e.g., fewer or more) channels to be included in control track 154.

In some implementations, control track conversion module 148 may perform signal processing to convert control track 112 into control track 154. For example, the frequency content of the plurality of channels of control track 112 may be analyzed in order to generate a control track having a single channel or other number of channels.

Control track conversion module 148 may convert a multi-channel control track into a control track having fewer channels based on a combination of the plurality of channels. For example, control track conversion module 148 may superpose the plurality of channels onto a single channel. Control track conversion module 148 may convert a multi-channel control track into a control track having fewer channels based on only a subset of the plurality of channels. For example, control track conversion module 148 may ignore one or more of the plurality of channels, use one or more channels having particular characteristics (e.g., those with higher or maximal intensities at a given time), and/or otherwise use fewer than the available channels.

In some implementations, control track conversion module 148 may alter one or more channels of control track 112 and/or control track 154 to make the control track more suitable (e.g., compatible with) haptic output device 160. For example, control track conversion module 148 may shift the frequency content of control track 112 to better match the bandwidth and frequency response of haptic output device 160. In some of these examples, control track conversion module 148 may extract the envelope of the one or more signals of control track 112 and/or control track 154 and fill the envelope with a sine wave running at the resonant frequency of haptic output device 160. In this manner, control track conversion module 148 may tune the haptic feedback to be provided based on a characteristic (e.g., the resonant frequency in the foregoing example) of haptic output device 160.

In some implementations, control track conversion module 148 may coordinate haptic feedback encoded into control track 154 to be output at approximately the same time as haptic feedback that is encoded by control track 112. For example, control track conversion module 148 may identify the timing of haptic feedback encoded by control track 112 such as a start time and/or an end time. Using the timing (which may or may not be embedded within control track 112) of haptic feedback, control track conversion module 148 may encode haptic feedback encoded into control track 154 at corresponding times (e.g., at similar start and/or end times). In this manner, haptic feedback encoded into control track 154 may start at times similar to start times of haptic feedback encoded into control track 112, may end at times similar to end times of haptic feedback encoded into control track 112, or may start and end at times similar to the start and end times of haptic feedback encoded into control track 112.

In some implementations, control track conversion module 148 may identify events and convert control track 112 into control track 154 based on the identified events. The events may be learned based on machine learning and pattern recognition, meta-data related to control track 112, media content associated with control track 112, and/or based on other information that may indicate events.

Control track conversion module 148 may use machine learning and pattern recognition to recognize one or more events within one or more channels of control track 112. The event may include a recognizable characteristic of the one or more of the channels, thereby indicating haptic feedback encoded by control track 112. For example, high amplitude on all channels may be inferred to cause haptic feedback that is associated with an explosion, while different channels having different amplitudes and directions may be inferred to cause a swiveling motion (e.g., different channels having control signals that cause different haptic output devices to swivel a chair) that is associated with flying.

In some implementations, meta-data extracted by haptic decoding module 146 and/or analysis of corresponding media content may be used to identify such events as well. In some implementations, the events may be mapped to particular haptic feedback. In these implementations, control track conversion module 148 may use conversion rules to generate control track 154 such that the particular haptic feedback is generated at haptic output device 160. In some instances, the particular haptic feedback may be configured to simulate the original haptic feedback generated by haptic output system 170 in response to control track 112. For example, control track 154 may be generated such that a haptic feedback is produced with strong vibrations to simulate the explosion effect. Control track 154 may be generated such that a slowly varying haptic feedback is produced to simulate the flying effect. Control track 154 may therefore be automatically generated by control track conversion module 148. However, computing device 140 may be programmed to allow for manual editing by a user such as a developer and/or end user.

In some implementations, control track editing module 150 may be configured to manually or semi-manually perform the conversion. Such manual conversion may include adjusting control track 154 to suit particular needs by adding new haptic feedback, removing automatically configured haptic feedback, and/or changing haptic feedback caused by control track 154. In some implementations, control track editing module 150 may allow for manual conversion of control track 112 while receiving suggestions from control track conversion module 148. For example, as a user is manually converting control track 112, control track conversion module 148 may provide suggestions on haptic feedback that it would generate. In some implementations, the user may provide suggestions to control track conversion module 148 as well to improve results. For example, the user may visually recognize certain events in media content and may suggest, alter, or remove (and computing device 140 may receive such suggestions via control track editing module 150) haptic feedback accordingly.

In some implementations, feedback coordination module 152 may be configured to coordinate video output and/or audio output with control track 112. In some implementations, feedback coordination module 152 may synchronize the video output and/or audio output based on a synchronizing code embedded into the media content and/or via time stamps that generally set a time for outputting each of the video output, audio output, and/or the haptic feedback.

In operation, media playback may be coordinated with control track 154 in various configurations. For example, a single device may include a display device (e.g., a touch screen) and haptic output device 160. Alternatively, multiple devices may be used to separately provide the media content and the haptic feedback. For example, a television may be used to provide media content while the haptic feedback is provided through a device that houses haptic output device 160. Devices that may house haptic output device may include, without limitation, a smartphone, a tablet computer, a wearable device (e.g., "smart glasses"), a game controller, a remote control, and/or other devices capable of housing haptic output device 160.

Although only a single haptic output device 160 is illustrated, computing device 140 may generate control track 154 that includes more than one channel such that more than one haptic output device 160 may be used. For example, computing device 140 may convert a multi-channel track into a control track having fewer channels, but such lesser number of channels is not necessarily limited to a single channel. Furthermore, computing device 160 may convert a multi-channel control track into a control track having the same number of channels such that a plurality of haptic output devices 160 are used to output corresponding haptic feedback. For example, when the number of haptic output devices 172 matches the number of haptic output devices 160, computing device 140 may be programmed to convert each channel of control track 112 based on the characteristics of haptic output devices 160. Still further, computing device 140 may convert a single channel control track into a control track having one or more channels.

In some implementations, computing device 140 may convert control tracks that are automatically generated as well. For example, control tracks that are automatically created based on video and/or audio content may be converted using the functions of computing device 140 described herein.

Furthermore, control tracks used to control motors that move a moving platform may be converted by computing device 140 to simulate the movements via haptic output device 160. For example, the command signals for the motors of an amusement park ride may be analyzed in order to detect accelerations (or other movements) caused by the motors. Such analysis may be performed using the various operations described herein to automatically generate control track 154, which may be provided to haptic output device 160 to simulate the movements. The control track 154 and optionally corresponding media content may be applied to a single device or multiple devices to provide haptic feedback and optionally video/audio that simulate the amusement park ride. Other applications will be apparent to those having skill in the art as well.

Computing device 140 may include a mobile device (e.g., a smartphone), a laptop computer, a desktop computer, a tablet computer, a gaming console, and/or other computing device.

Storage device 144 and other storage media described herein may include one or both of system storage that is provided integrally (i.e., substantially non-removable) with computing device 140 and/or removable storage that is removably connectable to computing device 140 via, for example, a port (e.g., a USB port, a firewire port, etc.) or a drive (e.g., a disk drive, etc.). Storage device 144 and other storage media described herein may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable non-transitory storage media. Storage device 144 and other storage media described herein may include one or more virtual storage resources (e.g., cloud storage, a virtual private network, and/or other virtual storage resources). Storage device 144 and other storage media described herein may store software algorithms, information determined by processor(s) 142, information received from computing device 140, and/or other information that enables computing device 140 to function as described herein.

Processor(s) 142 and other processors described herein are configured to provide information processing capabilities in computing device 140. As such, processor(s) 142 and other processors described herein may include one or more of a digital processor, an analog processor, a digital circuit designed to process information, an analog circuit designed to process information, a state machine, and/or other mechanisms for electronically processing information. Although processor(s) 142 and other processors described herein is illustrated in FIG. 1 as a single entity, this is for illustrative purposes only. In some implementations, processor(s) 142 and other processors described herein may include a plurality of processing units. These processing units may be physically located within the same device, or processor(s) 142 and other processors described herein may represent processing functionality of a plurality of devices operating in coordination. Processor(s) 142 and other processors described herein may be configured to execute modules by software; hardware; firmware; some combination of software, hardware, and/or firmware; and/or other mechanisms for configuring processing capabilities on processor(s) 142 and other processors described herein.

The various modules described herein are exemplary only. Other configurations and numbers of modules may be used, as well using non-modular approaches so long as the one or more physical processors are programmed to perform the functions described herein. It should be appreciated that although the various modules are illustrated in FIG. 1 as being co-located within a single processing unit, in implementations in which processor(s) 142 includes multiple processing units, one or more modules may be located remotely from the other modules. The description of the functionality provided by the different modules described herein is for illustrative purposes, and is not intended to be limiting, as any of modules may provide more or less functionality than is described. For example, one or more of the modules may be eliminated, and some or all of its functionality may be provided by other ones of the modules. As another example, processor(s) 142 may be configured to execute one or more additional modules that may perform some or all of the functionality attributed herein to one of the modules.

The components illustrated in FIG. 1 may be communicably coupled to one another via various communication links such as a network. The network may include wired or wireless connections. In some aspects of the invention, the network may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

Various inputs, outputs, configurations, and/or other information described herein as being stored or storable may be stored in one or more databases (not illustrated in FIG. 1). Such databases may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Standard Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Figure 2A:
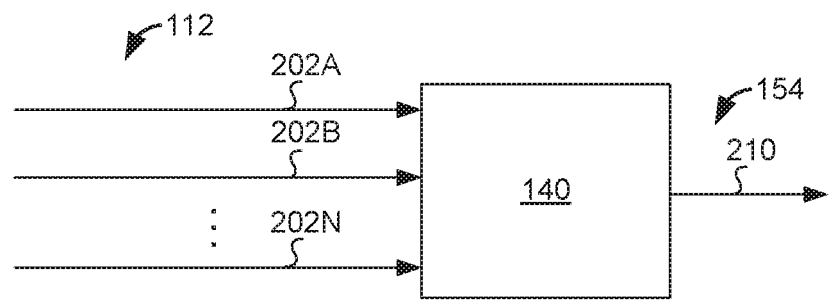
FIG. 2A illustrates an example of a computing device that converts a control track having a plurality of channels into a converted control track having a lesser number of channels, according to an aspect of the invention.

FIG. 2A illustrates an example of a computing device 140 that converts a control track 112 having a plurality of channels 202 into a converted control track 154 having a lower number of channels 210, according to an aspect of the invention. Although only a single channel 210 is illustrated, computing device 140 may be programmed to generate control track 154 to have any number of channels that is less than the number of channels 202 from control track 112. Thus, computing device 140 may convert a control track having three (or other number) of channels into a converted control track having two (or other lower number) of channels than the control track. As described herein, computing device 140 may do so by removing unwanted channels (e.g., selecting one or more channels to be representative of other channels), combining two or more channels, and/or otherwise generating a lower number of channels. It should be noted that at least one of the channels of control track 112 may be left unaltered such that control track 154 has at least one channel 202 from control track 112 that is left unaltered. Additionally or alternatively, at least one of the channels 202 of control track 112 may be altered such as by filling or otherwise modifying an envelope of the channel 202.

The example illustrated by FIG. 2A may be used, without limitation, where control track 112 is originally intended for use in a haptic output system having a greater number of haptic output devices than a target device/system having a lesser number of haptic output devices. For example, haptic feedback provided by a first apparatus having five haptic output devices may be simulated or otherwise provided by a second apparatus having one haptic output device by converting the original control track for use with the second apparatus.

Figure 2B:
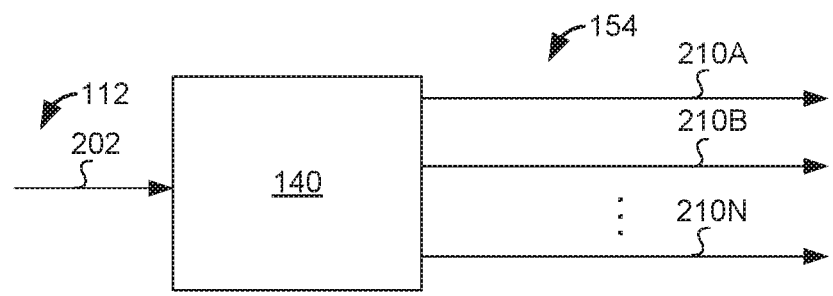
FIG. 2B illustrates an example of a computing device that converts a control track having a lesser number of channels into a converted control track having a greater number of channels, according to an aspect of the invention.

FIG. 2B illustrates an example of a computing device 140 that converts a control track 112 having a lesser number of channels 202 into a converted control track 154 having a greater number of channels 210, according to an aspect of the invention. Although only a single control track 202 is illustrated, computing device 140 may be programmed to convert control track 112 having any number of channels into control track 154 having a greater number of channels. As described herein, computing device 140 may do so by adding additional channels. Such added channels may be derived from one or more channels 202 (e.g., by averaging, merging, or otherwise combining two or more channels 202 to create an additional one or more channels; duplicating one or more channels 202, and/or otherwise adding a new channel 202).

The example illustrated by FIG. 2B may be used, without limitation, where control track 112 is originally intended for use in a haptic output system having a lower number of haptic output devices than a target device/system having a greater number of haptic output devices. For example, haptic feedback provided by a first apparatus having three haptic output devices may be simulated or otherwise provided by a second apparatus having six haptic output devices by converting the original control track for use with the second apparatus.

Figure 2C:
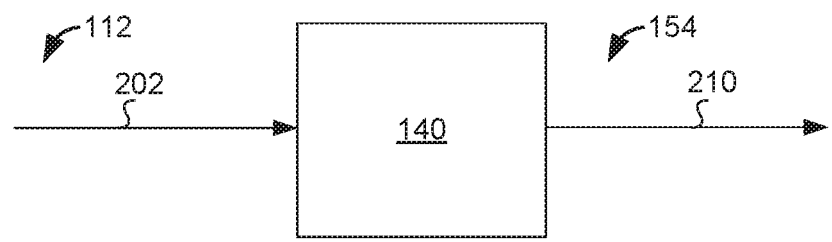
FIG. 2C illustrates an example of a computing device 140 that converts a control track having a given number of channels into a converted control track having the same number of channels, according to an aspect of the invention.

FIG. 2C illustrates an example of a computing device 140 that converts a control track 112 having a given number of channels 202 into a converted control track 154 having the same number of channels 210, according to an aspect of the invention. Although a single channel 202 and a single channel 210 is illustrated, computing device 140 may be programmed to convert any number of channels 202 to the same number of channels 210. In these implementations, computing device 140 may alter one or more of the channels 202 as described herein to convert them to corresponding channels 210.

The example illustrated by FIG. 2C may be used, without limitation, where control track 112 is originally intended for use in a haptic output system having the same number of haptic output devices as a target device/system. In some instances, at least one of the haptic output devices of the target device may be a different type of haptic output device than at least one of the haptic output devices of the original haptic output system.

Referring to FIGS. 2A, 2B, and 2C, in some implementations, two or more of the channels 210 may be substantially identical to (e.g., duplicates of) one another. In these implementations, at least two haptic output devices of the target device may provide the same haptic feedback.

Figure 3A:
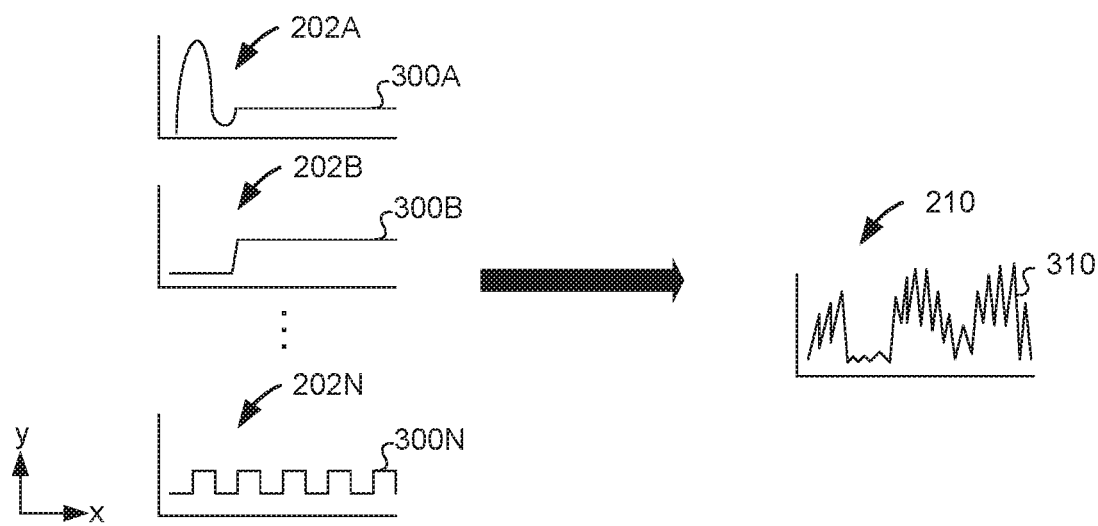
FIG. 3A illustrates an example of a plurality of channels each having a corresponding haptic profile converted into a lesser number of channels each having a different haptic profile, according to an aspect of the invention.
Figure 3B:
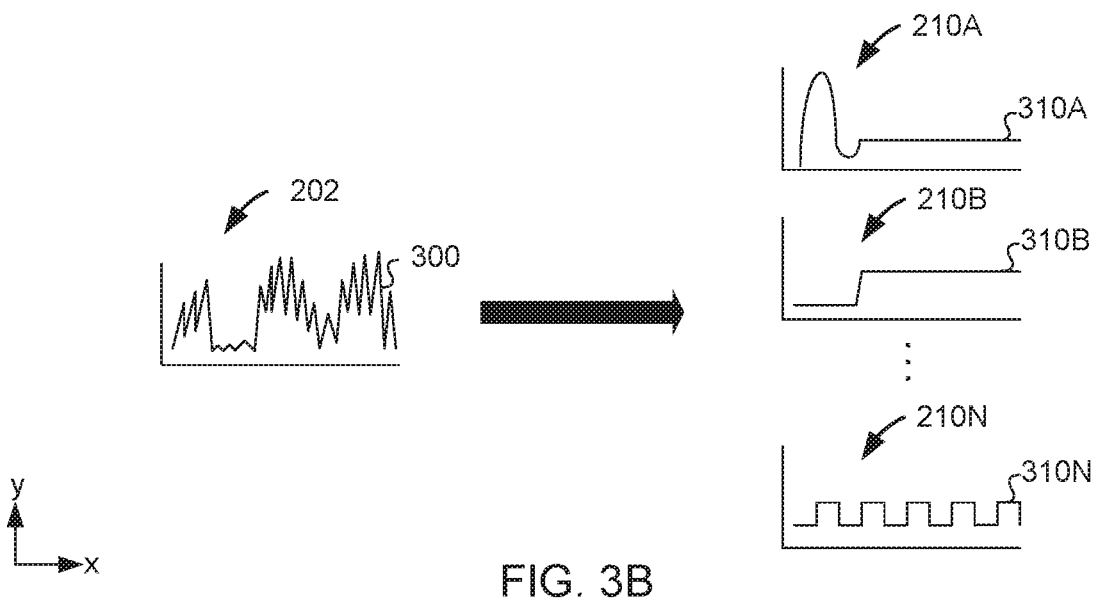
FIG. 3B illustrates an example of a lesser number of channels each having a corresponding haptic profile converted into a greater number of channels each having a different haptic profile, according to an aspect of the invention.
Figure 3C:
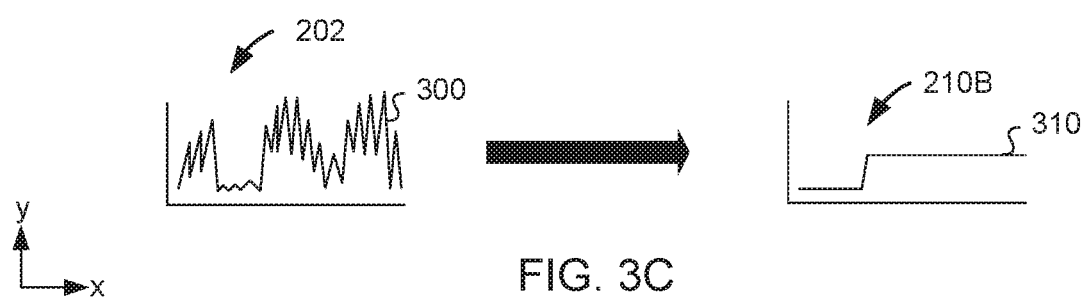
FIG. 3C illustrates an example of a given number of channels each having a corresponding haptic profile converted into the same number of channels each having a different haptic profile, according to an aspect of the invention.

FIG. 3A illustrates an example of a plurality of channels 202 each having a corresponding haptic profile 300 converted into a lesser number of channels 210 each having a different haptic profile 310, according to an aspect of the invention. FIG. 3B illustrates an example of a lesser number of channels 202 each having a corresponding haptic profile 300 converted into a greater number of channels 210 each having a different haptic profile 310, according to an aspect of the invention. FIG. 3C illustrates an example of a given number of channels 202 each having a corresponding haptic profile 300 converted into the same number of channels 210 each having a different haptic profile 310, according to an aspect of the invention.

Referring to FIGS. 3A, 3B, and 3C, non-limiting examples of haptic profiles are illustrated with respect to X and Y axes. In each of the force profiles, the Y axis may refer to a characteristic of a haptic feedback such as a magnitude and the X axis may refer to time. Channels 202 may be converted into channels 210 as discussed above with respect to FIGS. 2A, 2B, and 2C.

Figure 4:
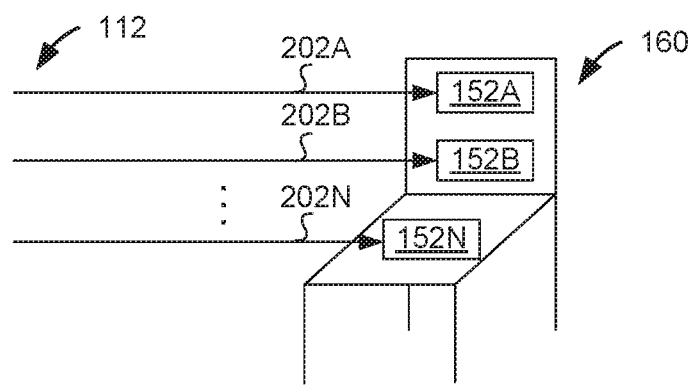
FIG. 4 illustrates an example of a haptic output system that outputs one or more haptic feedback based on a control track having a plurality of channels, according to an aspect of the invention.

FIG. 4 illustrates an example of a haptic output system 170 that outputs one or more haptic feedback based on a control track 112 having a plurality of channels 202, according to an aspect of the invention. Haptic output system 170 may include a system that is originally intended to provide haptic feedback based on control track 112. Haptic output system 170 is illustrated as a chair having multiple haptic output devices 172, although other configurations of haptic output system 170 may be used as well (such as, for example, a system of wearable devices each having a haptic output device 172, a computing device having a plurality of haptic output devices 172, etc.). In some implementations, a given haptic output device 172 may be configured to provide a particular type of haptic feedback that is different than other haptic feedback provided by other haptic output devices 172. For example, haptic output device 172N may swivel a chair, while haptic output device 172A may recline the chair forward or backward.

Figure 5:
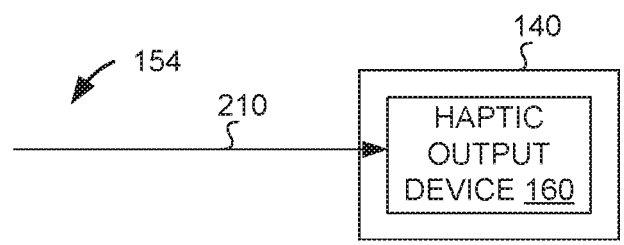
FIG. 5 illustrates an example of a device having a haptic output device that outputs haptic feedback based on a converted control track having a different number of channels than a control track from which the converted control track is generated, according to an aspect of the invention.

FIG. 5 illustrates an example of a computing device 140 having a haptic output device 160 that outputs haptic feedback based on a control track 154 having a different number of channels 210 than a control track from which control track 154 is generated, according to an aspect of the invention. Although only a single haptic output device 160 is illustrated in FIG. 5, computing device 140 may include more than one haptic output device 160. As illustrated, a control track 154 that was converted from control track 112 may be applied at a computing device 140 that houses a haptic output device 160. For example, the control track 112 (illustrated in FIG. 4 and other Figures) may be converted such that haptic output device 160 generates haptic feedback that is different from the haptic feedback provided by haptic output system 170. In this manner, a control track intended or otherwise designed for different numbers and/or types of haptic output devices may be converted and then used to provide haptic feedback to a device that may otherwise be incompatible with the control track.

Figure 6:
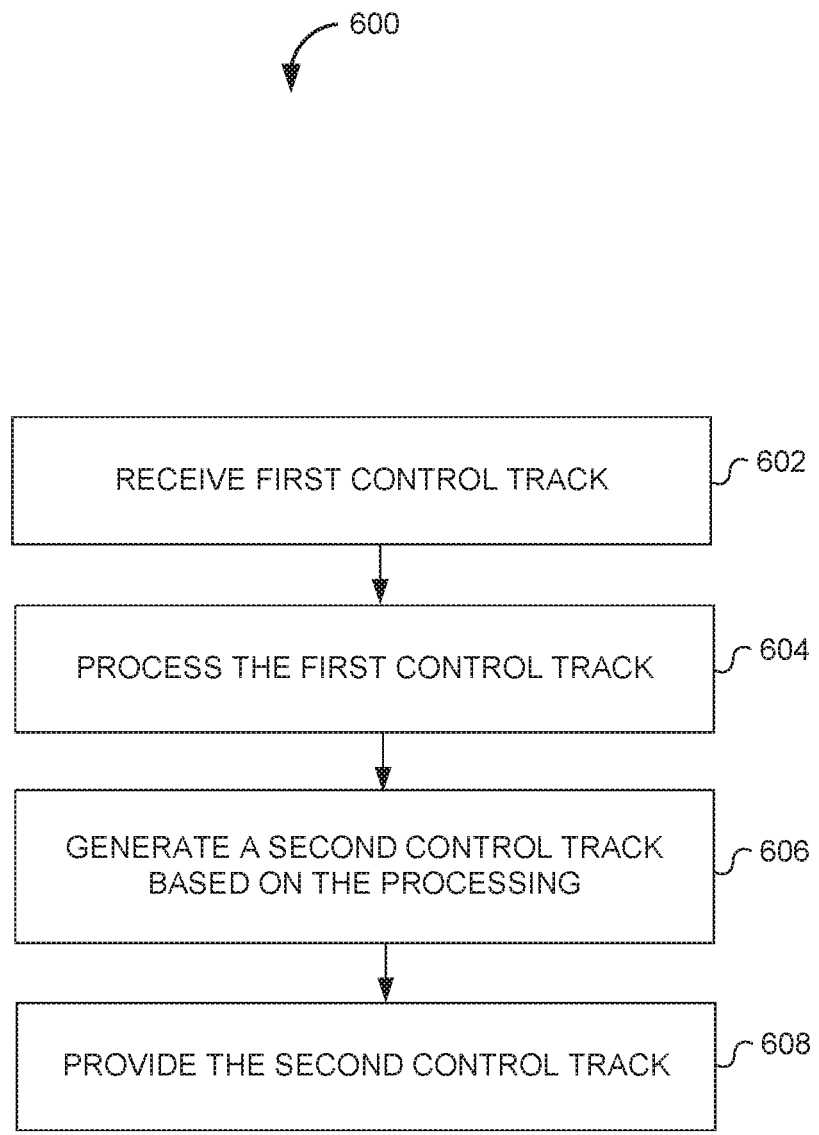
FIG. 6 illustrates a flowchart of a process of converting a control track for providing haptic feedback via a haptic output device, according to an aspect of the invention.

FIG. 6 illustrates a flowchart of a process 600 of converting a control track for providing haptic feedback via a haptic output device, according to an aspect of the invention. The various processing operations depicted in the flowchart of FIG. 6 and other drawing Figures are described in greater detail herein. The described operations may be accomplished using some or all of the system components described in detail above. According to an aspect of the invention, various operations may be performed in different sequences. In other implementations, additional operations may be performed along with some or all of the operations shown in FIG. 6 and other drawing Figures, or some operations may be omitted. In yet other implementations, one or more operations may be performed simultaneously. Accordingly, the operations as illustrated (and described in greater detail below) are exemplary in nature and, as such, should not be viewed as limiting.

In an operation 602, a first control track may be received. The first control track may be received via a stream, a stored filed, and/or other transfer mechanism. In an operation 604, the first control track may be processed. Such processing may include decoding the first control track to identify or otherwise obtain signals, meta-data, and/or other information encoded by the first control track. In streaming implementations, processing may occur on the streamed first control track by storing at least portions of the first control track in a memory buffer for processing. In stored file implementations, the first control track may be obtained from a memory device and then processed.

In an operation 606, a second control track may be generated based on the processing. The second control track may be generated based on processing the signals, meta-data, pattern recognition, and/or other information obtained or derived from the first control track. For example, control signals that cause haptic feedback to be provided may be modified, deleted, added to, and/or otherwise altered such that the second control track is generated. Alternatively or additionally, meta-data encoded by the first control track may be used to generate the second control track. Such meta-data may specify annotations that indicate events occurring in a corresponding media file (e.g., a movie). Responsive to such events, haptic feedback that can be output by a target haptic output device may be generated based on the events. For example, a given haptic feedback may be associated with a given event such that when the given event is indicated by the meta-data, the given haptic feedback is encoded in the second control track to correspond to the given event. Alternatively or additionally, signal or event patterns specified by the control signals or meta-data may be used to generate the second control track. For example, process 600 may learn that a particular control signal characteristic is correlated with a given event such as an explosion. In this manner, when an explosion or the given control signal is indicated, process 600 may encode in the second control track a haptic feedback for the event, which may be pre-stored or derived from the control signal from the first control track.

In an operation 608, the second control track may be provided to one or more haptic output devices (e.g., haptic output device 160 illustrated in FIG. 1). Although not illustrated, the second control track may alternatively or additionally be stored in a memory device for later provisioning to a haptic output device. In these implementations, various control tracks may be converted and stored for provisioning to a haptic output device.

Other aspects, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer-implemented method of providing haptic feedback executed by a processor, comprising:
   receiving a first haptic control track including a first plurality of channels;
   decoding the first haptic control track into a decoded first haptic control track;
   generating a second haptic control track including a second plurality of channels based on the decoded first haptic control track; and
   sending the second haptic control track to a haptic output device to provide the haptic feedback.

2. The computer-implemented method of claim 1, wherein the first haptic control track is configured for playback on a first system having a first plurality of haptic output devices and the second haptic control track is configured for playback on a second system having a second plurality of haptic output devices, and wherein the first plurality of haptic output devices includes more haptic output devices than the second plurality of haptic output devices.

3. The computer-implemented method of claim 1, wherein generating the second haptic control track includes converting the first plurality of channels into the second plurality of channels, the second plurality of channels including fewer channels than the first plurality of channels.

4. The computer-implemented method of claim 3, wherein generating the second haptic control track further includes at least one of removing a channel of the first plurality of channels, selecting a channel of the first plurality of channels as representative of at least one other channel of the first plurality of channels, and combining two channels of the first plurality of channels.

5. The computer-implemented method of claim 1, wherein the first haptic control track is configured for playback on a first system having a first plurality of haptic output devices and the second haptic control track is configured for playback on a second system having a second plurality of haptic output devices, and wherein the first plurality of haptic output devices includes fewer haptic output devices than the second plurality of haptic devices.

6. The computer-implemented method of claim 1, wherein generating the second haptic control track includes converting the first plurality of channels into the second plurality of channels, the second plurality of channels including more channels than the first plurality of channels.

7. The computer-implemented method of claim 6, wherein generating the second haptic control track further includes at least one of averaging, merging, or combining two or more channels of the first plurality of channels into a new channel of the second plurality of channels.

8. The computer-implemented method of claim 1, wherein the first haptic control track is configured for playback on a first system having a first plurality of haptic output devices and the second haptic control track is configured for playback on a second system having a second plurality of haptic output devices, and wherein first types of the first plurality of haptic output devices do not match second types of the second plurality of haptic output devices.

9. The computer-implemented method of claim 1, wherein generating the second haptic control track includes converting the first plurality of channels into the second plurality of channels, the second plurality of channels including a same number of channels as the first plurality of channels.

10. The computer-implemented method of claim 9, wherein the haptic output device is a second haptic output device, and generating the second haptic control track further includes converting one of the first plurality of channels configured for playback on a first haptic output device into one of the second plurality of channels configured for playback on the second haptic output device, wherein the first haptic output device is of a different type than the second haptic output device.

11. A system for providing haptic feedback comprising:
a processor; and
memory storing instructions that, when executed by the processor, cause the processor to receive a first haptic control track including a first plurality of channels,
decode the first haptic control track into a decoded first haptic control track,
generate a second haptic control track including a second plurality of channels based on the decoded first haptic control track, and send the second haptic control track to a haptic output device to provide the haptic feedback.

12. The system of claim 11, wherein the first haptic control track is configured for playback on a first system having a first plurality of haptic output devices and the second haptic control track is configured for playback on a second system having a second plurality of haptic output devices, and wherein the first plurality of haptic output devices includes more haptic output devices than the second plurality of haptic output devices.

13. The system of claim 11, wherein instructions that cause the processor to generate the second haptic control track include instructions that cause the processor to convert the first plurality of channels into the second plurality of channels, the second plurality of channels including fewer channels than the first plurality of channels.

14. The system of claim 13, wherein instructions that cause the processor to generate the second haptic control track further include instructions that cause the processor to perform at least one of
removing a channel of the first plurality of channels,
selecting a channel of the first plurality of channels as representative of at least one other channel of the first plurality of channels, or
combining two channels of the first plurality of channels.

15. The system of claim 11, wherein the first haptic control track is configured for playback on a first system having a first plurality of haptic output devices and the second haptic control track is configured for playback on a second system having a second plurality of haptic output devices, and wherein the first plurality of haptic output devices includes fewer haptic output devices than the second plurality of haptic devices.

16. The system of claim 11, wherein instructions that cause the processor to generate the second haptic control track include instructions that cause the processor to convert the first plurality of channels into the second plurality of channels, the second plurality of channels including more channels than the first plurality of channels.

17. The system of claim 16, wherein instructions that cause the processor to generate the second haptic control track further include instructions that cause the processor to perform at least one of averaging, merging, or combining two or more channels of the first plurality of channels into a new channel of the second plurality of channels.

18. The system of claim 11, wherein the first haptic control track is configured for playback on a first system having a first plurality of haptic output devices and the second haptic control track is configured for playback on a second system having a second plurality of haptic output devices, and wherein first types of the first plurality of haptic output devices do not match second types of the second plurality of haptic output devices.

19. The system of claim 11, wherein instructions that cause the processor to generate the second haptic control track include instructions that cause the processor to convert the first plurality of channels into the second plurality of channels, the second plurality of channels including a same number of channels as the first plurality of channels.

20. The system of claim 19, wherein the haptic output device is a second haptic output device, and the instructions that cause the processor to generate the second haptic control track further include instructions that cause the processor to convert one of the first plurality of channels configured for playback on a first haptic output device into one of the second plurality of channels configured for playback on the second haptic output device, wherein the first haptic output device is of a different type than the second haptic output device.

\* \* \* \* \*